(12) United States Patent
Matsuda

(10) Patent No.: US 6,211,649 B1
(45) Date of Patent: Apr. 3, 2001

(54) USB CABLE AND METHOD FOR CHARGING BATTERY OF EXTERNAL APPARATUS BY USING USB CABLE

(75) Inventor: Noriyuki Matsuda, Tokyo (JP)

(73) Assignee: Sourcenext Corporation, Tokyo (JP)

( * ) Notice: Subject to any disclaimer, the term of this patent is extended or adjusted under 35 U.S.C. 154(b) by 0 days.

(21) Appl. No.: 09/531,149

(22) Filed: Mar. 17, 2000

(30) Foreign Application Priority Data

Mar. 25, 1999 (JP) .................................................. 11-081574

(51) Int. Cl.[7] .......................... H01M 10/44; H01M 10/46
(52) U.S. Cl. ............................................. 320/115; 320/163
(58) Field of Search .................................... 320/105, 111, 320/112, 113, 114, 115, 128, 134, 161, 162, 163, 164

(56) References Cited

U.S. PATENT DOCUMENTS 5,510,691 * 4/1996 Palatov .

5,723,970 * 3/1998 Bell .

FOREIGN PATENT DOCUMENTS 10-326128    12/1998 (JP) .

* cited by examiner

*Primary Examiner*—Edward H. Tso
(74) *Attorney, Agent, or Firm*—Wenderoth, Lind & Ponack, L.L.P.

(57) ABSTRACT

A USB cable according to the present invention has a USB connector connected with a USB port of a PC (Personal Computer), a phone connector connected with a connector of an external connector such as a mobile phone, a control unit, which is situated between the USB connector and the phone connector, for charging a battery of the mobile phone by using power supplied from the USB port of the PC and for transmitting and receiving data with the PC and the mobile phone, and a cable for connecting the USB connector and the phone connector with the control unit respectively.

13 Claims, 5 Drawing Sheets

USB CABLE AND METHOD FOR CHARGING BATTERY OF EXTERNAL APPARATUS BY USING USB CABLE

FIELD OF THE INVENTION

This invention relates to a USB (Universal Serial Bus) cable for connecting an external apparatus such as a mobile phone with a USB port of a PC (Personal Computer). More particularly the invention relates to a USB cable which can charge a battery of an external apparatus connected with a PC via the USB cable, and a method for charging a battery of an external apparatus by using the USB cable.

BACKGROUND OF THE INVENTION

Recently, a PC has one or more USB ports as a standard specification. The USB provides a function for connecting a device (an external apparatus) in the tree structure, a function for supporting two transmission speeds of 12 megabits per second and 1.5 megabits per second, a function for supporting PnP (Plug and Play), a function for supplying power to a connected device, and a function for supporting hot plug (which enables to connect and disconnect with a running PC).

A method for supplying power to a display device through a USB is disclosed in Japanese Patent Publication No. JP10-326128. In this method, the power is saved effectively by supplying power to a display device through a USB at a power-saving mode.

In general, a keyboard, a mouse and the like, which need to be supplied low-level power, are connected with the USB port having such functions. Also as the USB port supports the transmission speed of 12 megabits per second, a printer, a scanner and the like can be also connected.

On the other hand, as Internet and a mobile phone have been popularized, the mobile phone is usually used as a communication medium while being connected with the Internet.

Moreover, as the memory function and the display function of the mobile phone have been improved, the mobile phone is capable of recording data not only telephone numbers but also addresses, names and ringing melodies concerned with the telephone numbers in the memory and is capable of displaying the data.

Also, software for reading and editing the data recorded in the memory of the mobile phone and for recording the data in the memory of the mobile phone, by connecting the mobile phone with the PC, is sold.

Like the above, a variety of apparatuses are connected with the USB port of the PC, and the mobile phone is generally used while being connected to the PC. Also, as the opportunity to send and receive electronic mails via the Internet increases, the mobile phone is generally used while being connected to the PC.

In the conventional cable for connecting the mobile phone and the like with the PC, however, there are disadvantages in that the battery of the mobile phone needs to be recharged at the time of starting to use the mobile phone while connecting to the PC, because the batteries of the mobile phone and the like are charged by a special battery charger.

SUMMARY OF THE INVENTION

Accordingly, it is an object of the invention to provide a USB cable, which is capable of transmitting data and charging a battery simultaneously for an external apparatus having a rechargeable battery such as a mobile phone connected with a USB port of a PC and a method for charging a battery of an external apparatus by using the USB cable.

According to the first feature of the invention, a USB (Universal Serial Bus) cable for charging a battery of an external apparatus comprises a first connector connected with a USB port of a personal computer, a second connector connected with a connector of an external apparatus, a cable for connecting the first connector and the second connector, and charging means, which is situated between the first connector and the second connector, for charging a battery of the external apparatus by using power supplied from the USB port.

According to the second feature of the invention, a method for charging a battery of an external apparatus connected with a USB port of a personal computer by using a USB cable comprises the steps of (A) regulating a voltage of USB power (a voltage value $V_0$) supplied from the USB port of the personal computer to be a predetermined voltage (a voltage value $V_C$), (B) outputting the regulated voltage (the voltage value $V_C$) to the external apparatus and charging the battery of the external apparatus with the regulated voltage (the voltage value $V_C$), (C) detecting the regulated voltage (the voltage value $V_C$), (D) detecting whether the detected voltage value $V_C$ is in the range of a predetermined threshold or not, (E) generating a voltage interrupt signal in case where the detected voltage value $V_C$ is out of the range of the predetermined threshold and (F) interrupting the charging process of the step (B) in accordance with the voltage interrupt signal.

BRIEF DESCRIPTION OF THE DRAWINGS

The invention will be described in more detail in conjunction with the appended drawings, wherein.

DETAILED DESCRIPTION OF THE PREFERRED EMBODIMENTS

Figure 1:
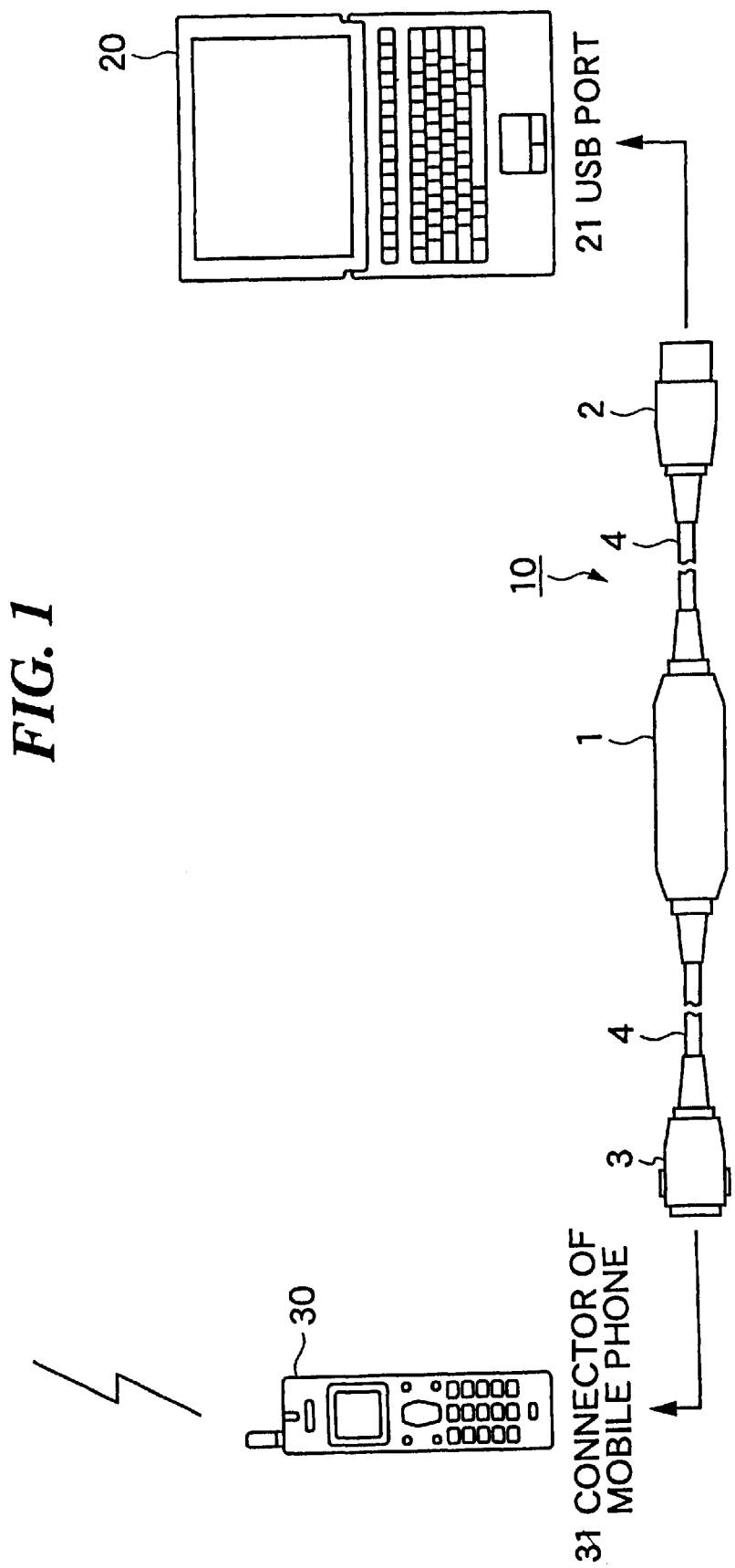
FIG. 1 is a view showing an embodiment of the USB cable according to the present invention.

In the following, a USB cable and a method for charging a battery of an external apparatus by using the USB cable according to the present invention will be explained in detail referring to the drawings.

FIG. 1 is a view showing an embodiment of the USB cable according to the present invention. In FIG. 1, the USB cable 10 comprises a USB connector 2 connected with a USB port 21 of a PC (Personal Computer) 20, a phone connector 3 connected with a connector 31 of an external apparatus 30 such as a mobile phone, a control unit 1, which is situated between the USB connector 2 and the phone connector 3, for charging a battery of the mobile phone 30 by using power supplied from the USB port 21 of the PC 20 and for transmitting and receiving data with the PC 20 and the mobile phone 30, and a cable 4 for connecting the USB connector 2 and the phone connector 3 with the control unit 1, respectively.

Figure 2:
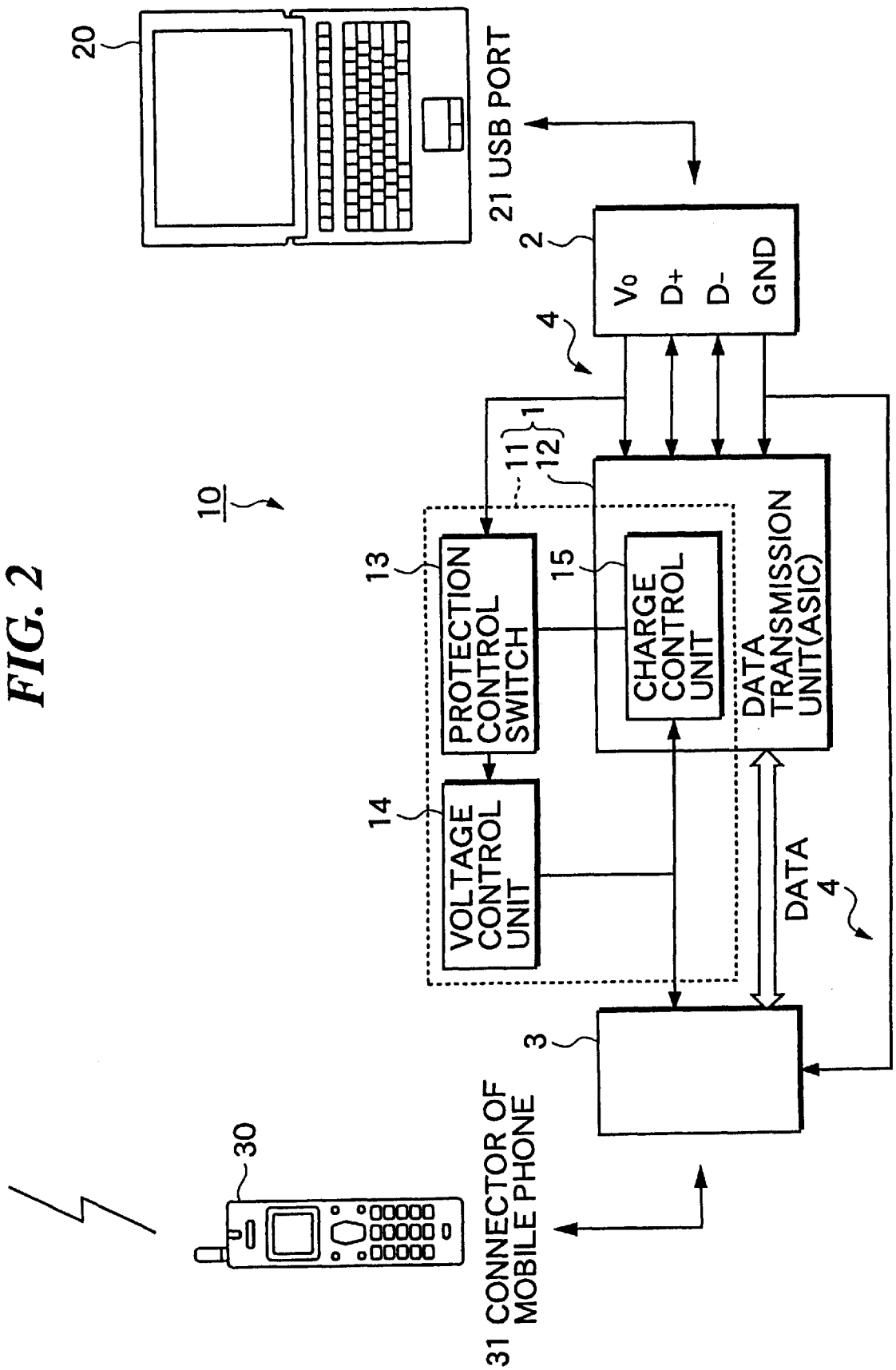
FIG. 2 is a view showing an embodiment of the composition of the USB cable according to the present invention.

FIG. 2 is a view showing an embodiment of the composition of the USB cable according to the present invention. Still, an identical number is appended to the thing having the identical composition in FIG. 2 with FIG. 1.

In FIG. 2, the USB connector 2 has four pins which are a power pin for supplying a USB voltage $V_0$ provided from the USB port 21, a ground pin connected with a ground (GND: 0[V]), a D+ pin for transmitting a signal (D+) and a D- pin for transmitting a signal (D-).

The control unit 1 comprises a charging unit 11 for charging a battery of the mobile phone 30 (the external apparatus) and a data transmission unit 12 for transmitting and receiving data with the PC 20 and the mobile phone 30. Also, the charging unit 11 comprises a voltage control unit 14 for regulating the USB voltage $V_0$ supplied from the power pin to a predetermined voltage $V_C$ and for outputting to the phone connector 3, a charge control unit 15 for detecting the voltage $V_C$ outputted from the voltage control unit 14 and a temperature T of the control unit 1 and for generating an interrupt signal in case where the voltage $V_C$ and/or the temperature T exceeds a predetermined threshold, and a protection control switch 13 for interrupting the supply of the power to the voltage control unit 14 in accordance with the interrupt signal from the charge control unit 15.

Then, the data transmission unit 12 is able to be included in an ASIC (Application Specific Integrated Circuit) which includes the charge control unit 15 as a firmware.

Also, the protection control switch 13 is able to be made of an intelligent n-channel MOS (Metal Oxide Semiconductor) transistor.

In the following, the charging function of the USB cable according to the invention will be explained in details.

Figure 3:
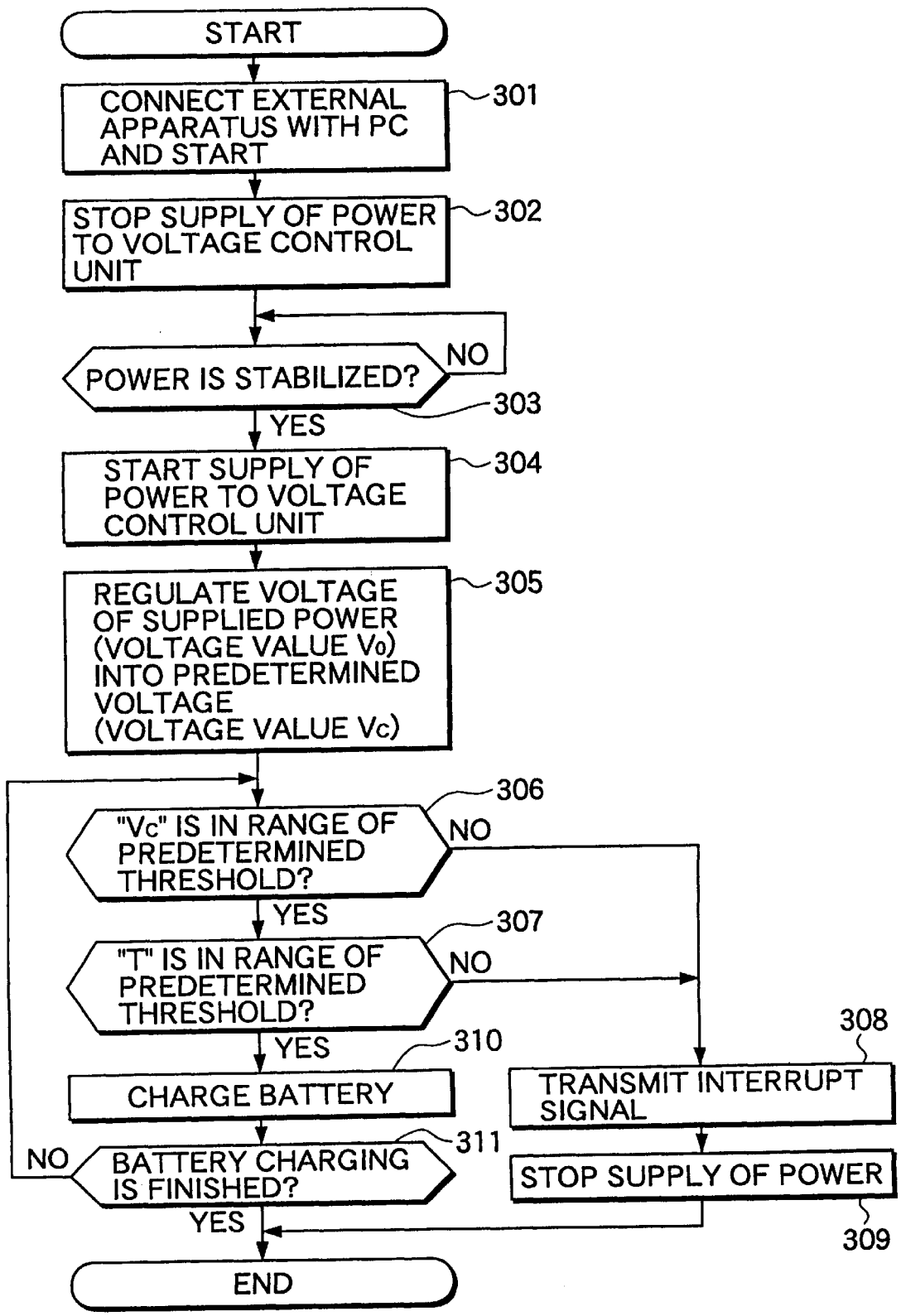
FIG. 3 is a flowchart showing processes of the charging function according to the present invention.

FIG. 3 is a flowchart showing processes of the charging function according to the present invention. In FIG. 3, the mobile phone 30 (the external apparatus) is connected with the PC 20 and is available (in the step 301). Then, the protection control switch 13 of the charging unit 11 stops the supply of power to the voltage control unit 14 firstly (in the step 302). This is for preventing the damage of the battery of the mobile phone 30 by overvoltage (overcurrent) in the starting to supply the power.

Next, after the predetermined time passes, in case where the supplied power (a voltage value $V_0$) is stabilized (in the step 303), the protection control switch 13 starts to supply the power to the voltage control unit 14 (in the step 304).

The voltage control unit 14 regulates the supplied power (the voltage value $V_0$) to the power of a predetermined voltage (a voltage value $V_C$) suitable for the battery of the external apparatus (in the step 305).

The charge control unit 15 detects the voltage (the voltage value $V_C$) outputted from the voltage control unit 14 and the temperature T measured by a temperature sensor (not shown) in the control unit 1, and detects whether each value (the voltage value $V_C$ and/or the temperature T) is in the range of the predetermined threshold or not (in the steps 306 and 307).

In case where either of these values (the voltage value $V_C$ and/or the temperature T) exceeds the range of the predetermined threshold (in the steps 306 and 307), the charge control unit 15 transmits an interrupt signal to the protection control switch 13 (in the step 308).

The protection control switch 13 stops the supply of the power for the voltage control unit 14 in accordance with the interrupt signal (in the step 309), and finishes the charging processing. Next, in case where either of these values (the voltage value $V_C$ and/or the temperature T) returns in the range of the predetermined threshold, the protection control switch 13 is able to restart to supply the power instead of finishing the charging processing. In this time, the power supplied from the voltage control unit 14 would not be supplied to the phone connector 3 until the supply of the power is restarted.

On the other hand, while each value (the voltage value $V_C$ and the temperature T) is in the range of the predetermined threshold, the battery of the mobile phone 30 (the external apparatus) is charged by using the power (the voltage value $V_C$) regulated in the voltage control unit 14 via the phone connector 3 (in the step 310). When the battery of the mobile phone 30 is charged perfectly (in the step 311), the charging processing is completed.

Figure 4:
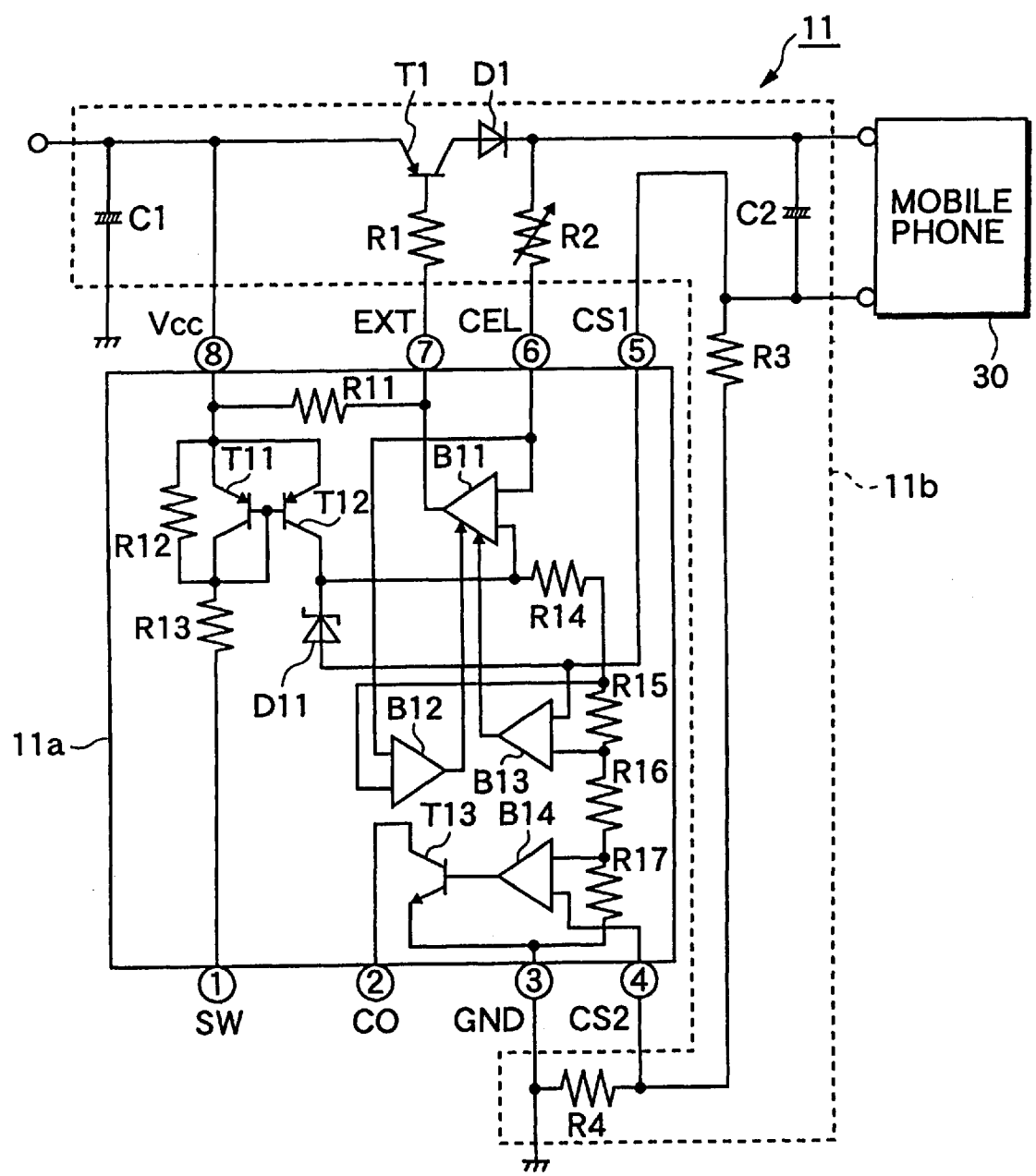
FIG. 4 is a view showing a specific example of the charging unit of the USB cable according to the present invention.

FIG. 4 is a view showing a specific example of the charging unit 11 described in FIG. 2. In FIG. 4, the charging unit 11 comprises a main part 11a and a peripheral part 11b. The main part 11a comprises a plurality of resistances R11~R17, a plurality of transistors T11~T13, a diode D11, a plurality of buffers B11~B14 and first ~ eighth terminals.

The first terminal is an input terminal SW for controlling on/off (a SW terminal), the second terminal is a full charge signal output terminal C0 (a C0 terminal), the third terminal is a ground terminal GND (a GND terminal), the fourth terminal is a full charge detection terminal CS2 (a CS2 terminal), the fifth terminal is a current detection terminal CS1 (a CS1 terminal), the sixth terminal is a battery voltage input terminal CEL (a CEL terminal), the seventh terminal is a low voltage circuit output terminal EXT (a EXT terminal) and the eighth terminal is a power input terminal $V_{CC}$ (a $V_{CC}$ terminal).

The peripheral part 11b comprises a power input side capacitor C1, a power output side capacitor C2, a PNP transistor T1, a diode D1, resistances R1, R3, R4, and a variable resistance R2.

In the above mentioned constitution, a power voltage $V_{CC}$ is supplied from the $V_{CC}$ terminal where the SW terminal is off. Also, a GND voltage (0[V]) is supplied from the GND terminal where the SW terminal is on. The NPN transistor T13 becomes "off" by an output signal outputted from the C0 terminal while the battery of the mobile phone 30 is being charged. On the other hand, the NPN transistor T13 becomes "on" by an output signal outputted from the C0 terminal where the battery of the mobile phone 30 is fully charged. In the CS2 terminal, a full charge signal is controlled by detecting a current from a voltage drop at the resistances R3 and R4 of the peripheral part 11b. In the CS1 terminal, a constant current signal is controlled by detecting a current occurred by a voltage drop at the resistances R3 and R4 of the peripheral part 11b.

In the CEL terminal, a charging voltage is stabilized in a predetermined voltage by detecting a battery voltage of the mobile phone 30. Then, in case where the battery voltage of the mobile phone 30 is a low voltage, and that is to say, in case where the battery voltage of the mobile phone 30 is below a predetermined battery voltage, the charging processing for the battery of the mobile phone 30 is able to be interrupted.

In the EXT terminal, a constant voltage control is executed by controlling a gate of a base of the PNP transistor T1. In this case, a p-channel FET (Field Effect Transistor) is able to be used instead of the PNP transistor T1. In this time, in the EXT terminal, a constant voltage control is able to be executed by controlling a gate of a base of the p-channel FET in the peripheral part 11b.

The diode D1 of the peripheral part 11b is provided in order to prevent a reverse-current from the battery of the mobile phone 30. Also, the accuracy of the charging function is able to be improved by adjusting the variable resistance R2.

The charging current is able to be controlled by the sum of the resistance R3 and the resistance R4 (R3+R4). In this time, the value of the full charge voltage to be detected is able to be controlled by a ratio of the resistance R3 to the resistance R4.

Figure 5:
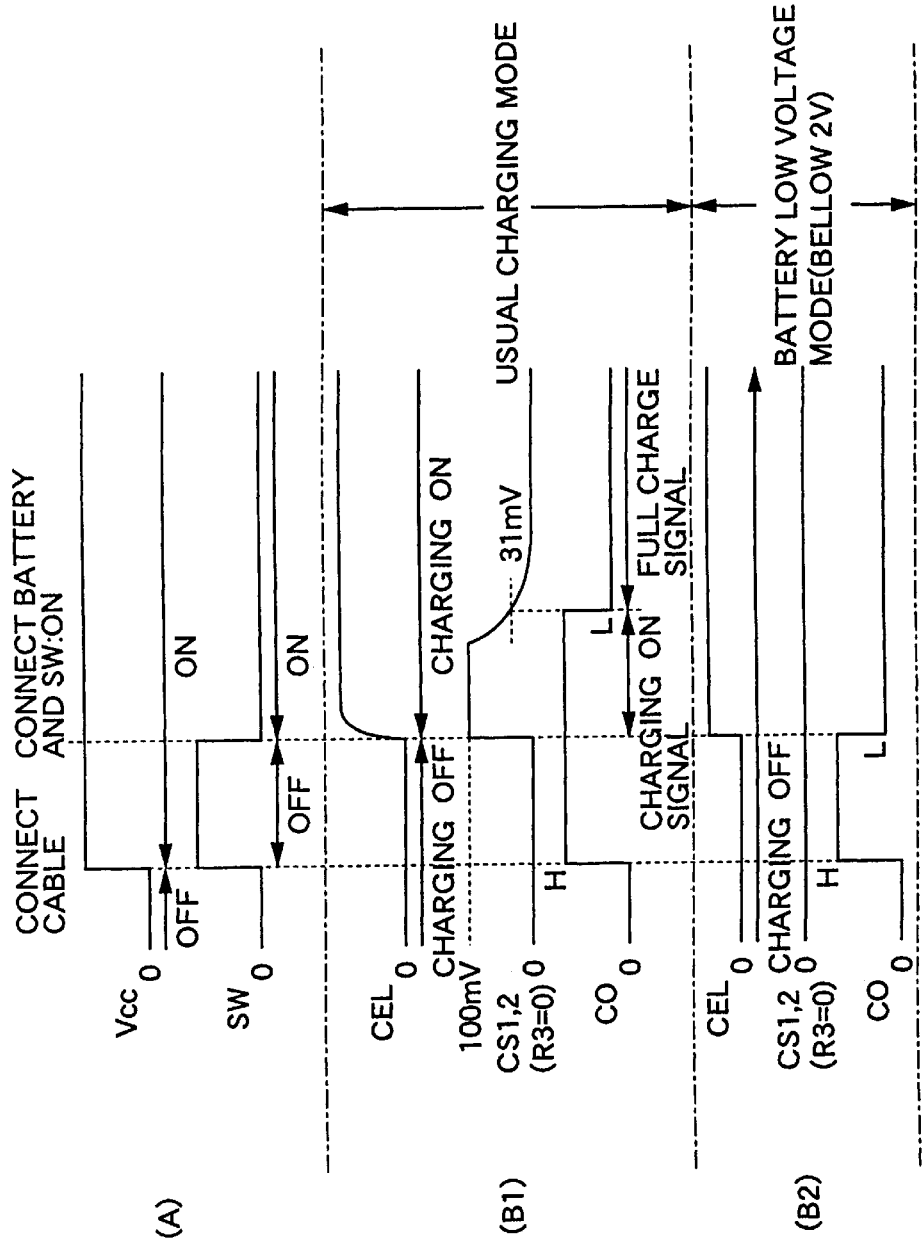
FIG. 5 is a timing chart showing the charging function of the USB cable according to the present invention.

FIG. 5 is a timing chart of the charging processing for the battery of the mobile phone 30. FIG. 5(A) is a timing chart of the $V_{CC}$ terminal and the SW terminal. FIG. 5(B) is a timing chart of the CEL terminal, the CS1 terminal, the CS2 terminal and the C0 terminal in the situation where the battery voltage of the mobile phone 30 exceeds a predetermined voltage (2 [V] in FIG. 5) (this situation may be described the usual charging mode in the following). On the other hand, FIG. 5(C) is a timing chart of the CEL terminal, the CS1 terminal, the CS2 terminal and the C0 terminal in the situation where the battery voltage of the mobile phone 30 is below a predetermined voltage (2 [V] in FIG. 5) (this situation may be described the battery low voltage mode in the following). In this case, a value of the resistance R3 of the peripheral part 11b is 0 [Ω].

As shown in FIG. 5, in the usual charging mode, a charging processing is executed, after the mobile phone 30 is connected and a predetermined time passes (the steps 301~304 in FIG. 3). Also, in the battery low voltage mode, since a charging-on signal is not generated, a charging processing is not executed (the step 306~309 in FIG. 3).

Until now, the USB cable and the method for charging the battery of the external apparatus by the USB cable according to the present invention are explained. Every apparatus having the battery which can be charged by using power supplied from the USB port of the PC is able to be used as the external apparatus without limiting to a mobile phone.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A USB (Universal Serial Bus) cable for charging a battery of an external apparatus comprising:
    a first connector connected with a USB port of a personal computer;
    a second connector connected with a connector of the external apparatus;
    a cable for connecting the first connector and said second connector; and
    charging means, which is situated between said first connector and said second connector, for charging a battery of the external apparatus by using power supplied from the USB port.

2. The USB cable of claim 1, wherein
said charging means comprises:
    voltage control means for charging the battery of the external apparatus by using the power supplied from the USB port with a voltage controlled to be a predetermined value;
    overvoltage protection means for interrupting the supply of the power to said voltage control means in case where a voltage supplied from said voltage control means exceeds a predetermined threshold; and
    temperature protection means for interrupting the supply of the power to said voltage control means in case where a temperature of said voltage control means exceeds a predetermined threshold.

3. The USB cable of claim 2, wherein
said charging means comprises charge control means for detecting a voltage supplied from said voltage control means and a temperature of said voltage control means, for generating and sending a voltage interrupt signal to said overvoltage protection means in case where the voltage exceeds the predetermined threshold, and for generating and sending a temperature interrupt signal to said temperature protection means in case where the temperature exceeds the predetermined threshold;
said overvoltage protection means of said charging means interrupts the supply of the power to said voltage control means upon receiving the voltage interrupt signal; and
said temperature protection means of said charging means interrupts the supply of the power to said voltage control means upon receiving the temperature interrupt signal.

4. The USB cable of claim 3, wherein
said overvoltage protection means and said temperature protection means include intelligent n-channel MOS (Metal Oxide Semiconductor) transistors.

5. The USB cable of claim 1, further comprising,
data transmission means for transmitting data between the personal computer and the external apparatus.

6. The USB cable of claim 5, wherein
said data transmission means includes an ASIC (Application Specific Integrated Circuit).

7. The USB cable of claim 1, wherein
the charging means does not carry out the charging for said battery of the external apparatus in case where a voltage of the battery of the external apparatus is below a predetermined voltage.

8. The USB cable of claim 1, wherein
the external apparatus is a mobile phone.

9. A method for charging a battery of an external apparatus connected with a USB port of a personal computer by using a USB cable, comprising:
    (A) regulating a voltage of USB power (a voltage value $V_0$) supplied from the USB port of the personal computer to be a predetermined voltage (a voltage value $V_C$);
    (B) outputting the regulated voltage (the voltage value $V_C$) to the external apparatus and charging the battery of the external apparatus with the regulated voltage (the voltage value $V_C$);
    (C) detecting the regulated voltage (the voltage value $V_C$);
    (D) detecting whether the detected voltage value $V_C$ is in the range of a predetermined threshold or not;
    (E) generating a voltage interrupt signal in case where the detected voltage value $V_C$ is out of the range of the predetermined threshold; and
    (F) interrupting the charging process of said step (B) in accordance with the voltage interrupt signal.

10. The method for charging the battery of the external apparatus by using the USB cable of claim 9, further comprising, before said step (A), the following:
    (A0) waiting to start said step (A) after the external apparatus starts and until predetermined time passes.

11. The method for charging the battery of the external apparatus by using the USB cable of claim 10, wherein said step (A) is the step of regulating a voltage of USB power (a voltage value $V_O$) supplied from the USB port of the personal computer to be a predetermined voltage (a voltage value $V_C$), in case where the USB power (the voltage value $V_O$) supplied from the USB port is stabilized.

12. The method for charging the battery of the external apparatus by using the USB cable of claim 9, further comprising:

(G) detecting a temperature (T) of the USB cable;

(H) detecting whether the temperature (T) detected by said step (G) is in the range of a predetermined threshold or not;

(I) generating a temperature interrupt signal in case where the temperature (T) is out of the range of the predetermined threshold; and (J) interrupting the charging process of said step (B) in accordance with the temperature interrupt signal.

13. The method for charging the battery of the external apparatus by using the USB cable of claim 9, wherein said step (B) is the step of outputting the regulated voltage (the voltage value $V_C$) to the external apparatus and charging the battery of the external apparatus with the regulated voltage (the voltage value $V_C$), in case where a voltage of the battery of the external apparatus exceeds a predetermined voltage.

* * * * *